Sept. 13, 1938.　　　　E. R. BERGMANN　　　　2,129,809
SHAKER CONVEYER
Filed June 19, 1936　　　　2 Sheets-Sheet 1

Inventor
Ernst R. Bergmann
Clarence F. Poole
Attorney

Sept. 13, 1938.  E. R. BERGMANN  2,129,809
SHAKER CONVEYER
Filed June 19, 1936  2 Sheets-Sheet 2
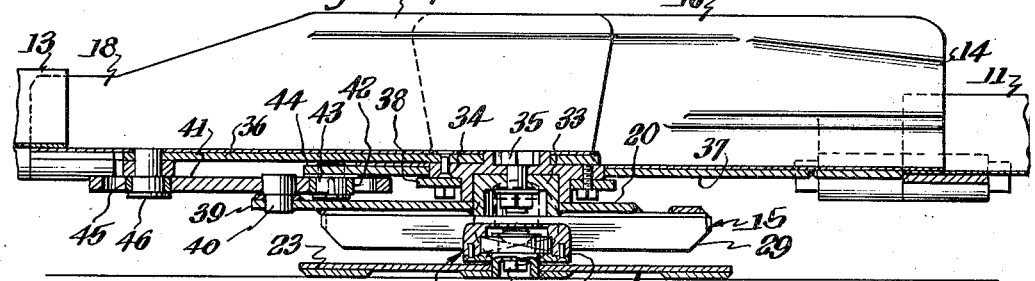
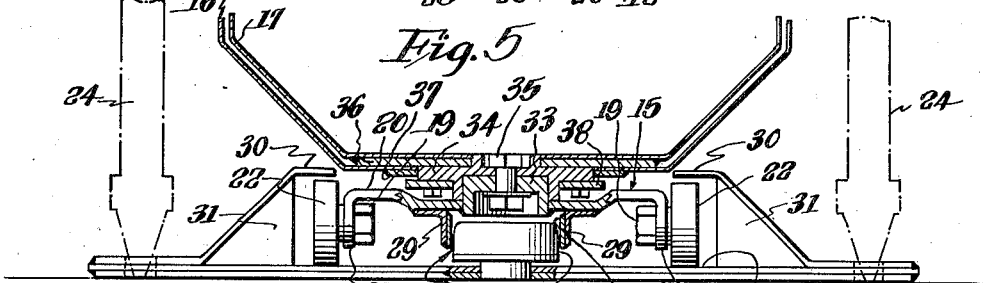
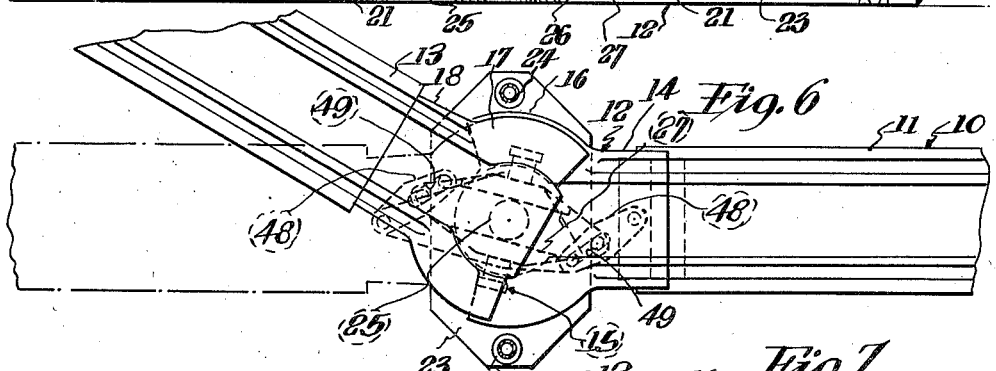
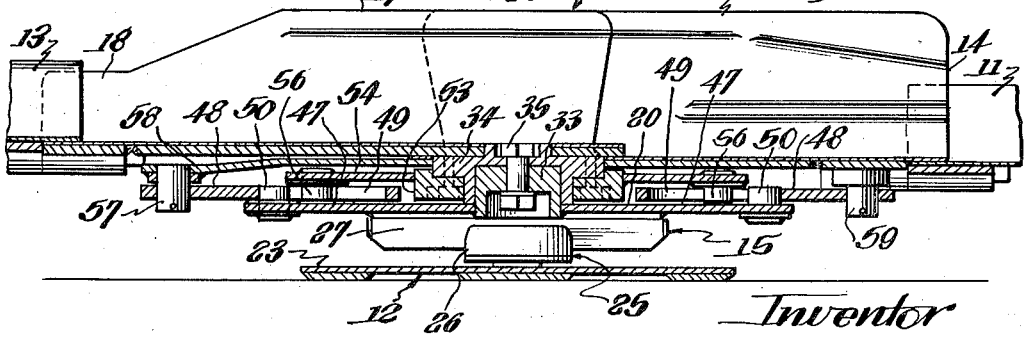
Inventor
Ernst R. Bergmann
Clarence T. Poole
Attorney Patented Sept. 13, 1938

2,129,809

UNITED STATES PATENT OFFICE 2,129,809

SHAKER CONVEYER

Ernst R. Bergmann, Chicago, Ill., assignor to Goodman Manufacturing Company, Chicago, Ill., a corporation of Illinois Application June 19, 1936, Serial No. 86,037

17 Claims. (Cl. 198—220)

This invention relates to improvements in shaker conveyers and has among other objects to provide a novel form of swivel connection in a shaker conveyer trough line which permits swiveling movement of one portion of the trough line with respect to the other in a horizontal plane and which is constructed in such a manner as to increase the efficiency of the conveying action of the driven or swiveled portion of the trough line.

As heretofore constructed, swivels for shaker conveyer trough lines have consisted of a pendulum pivotally held to the ground for swinging movement in a horizontal plane by means of a jack, which pendulum is pivotally connected at its free end to the trough line at a point coaxial with the swiveling axis thereof. This type of swivel imparts a side movement or angular thrust toward one side of the driven section of the trough line equal to the angle of thrust between the driving and driven sections of the trough line. This cannot be reduced unless the jack is set each time the position of the driven portion of the trough line is changed. This angular thrust causes the coal to move in an angular direction toward the side of the trough instead of along its center and materially slows up coal travel along the trough. The device of my invention is so arranged as to make it unnecessary to change the position of the pendulum each time the position of the driven trough is changed in order to minimize this side thrust on the driven trough section, and provides a swivel connection so constructed that coal may readily move along the driven trough at substantially the same rate of speed as along the driving trough for varying positions of the driven trough with respect to the driving trough.

Other objects of my invention will appear from time to time as this specification proceeds.

My invention may more readily be understood with reference to the accompanying drawings wherein:

Figure 4 is a longitudinal sectional view of the swivel shown in Figure 3, drawn to an enlarged scale;

Figure 5 is a transverse sectional view of the swivel shown in Figure 3, drawn to the same scale as Figure 4;

Figure 6 is a fragmentary plan view of a conveyer trough line showing a modified form in which my invention may be embodied; and Figure 7 is an enlarged longitudinal sectional view of the embodiment of my invention shown in Figure 6.

Like reference characters refer to like parts throughout the various figures.

Figure 1:
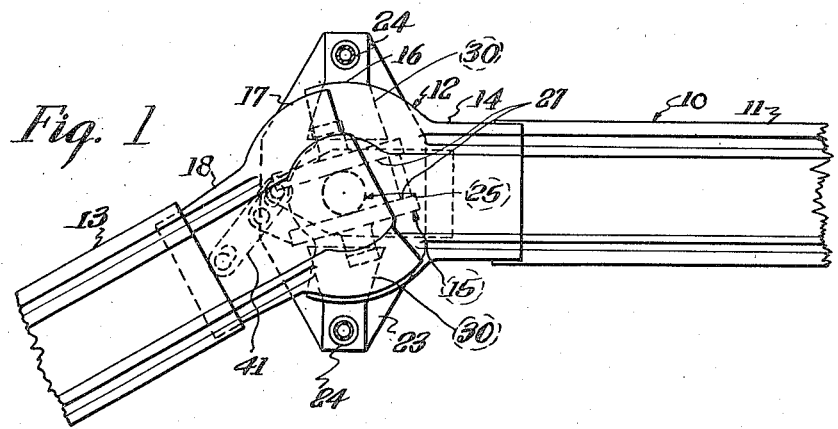
Figure 1 is a fragmentary top plan view of a conveyer trough line with a swivel constructed in accordance with my invention inserted therein.

In the drawings, the embodiment of my invention illustrated is shown as being connected in a shaker conveyer trough line 10, which is driven from suitable drive mechanism (not shown) in the usual manner. The trough line 10 includes a driving trough section 11 detachably connected at its forward end to a swivel generally indicated by reference character 12 in the usual manner, and a driven trough section 13 detachably connected at its rearward end to said swivel in the usual manner, so that said driven trough section may be swung at varying angular positions with respect to said driving trough section in a horizontal plane, to permit the trough line to negotiate curves or to form a means wherein a pick-up member disposed at the forward end of said driven trough section may be positioned to gather material at various points along a coal face.

The swivel 12 includes a relatively short trough section 14 connected to the forward end of the driving trough section 11 in a suitable manner and mounted on a carrier member 15 at its forward end in a manner which will hereinafter more clearly appear as this specification proceeds. Said trough section has an enlarged hopper-like forward end 16, the sides of which are of an arcuate formation. The sides of said hopper-like forward end are adapted to have a hopper-like rear end 17 of a trough section 18, nested therein so that said trough sections may be horizontally swiveled with respect to each other without a break in the sides of the trough line at said swivel, the forward end of which trough section is connected to the rearward end of the trough section 13.

The carrier member 15 includes a transversely extending support bracket 20 having depending ends 21, 21 on which are mounted anti-friction rollers 22, 22 on bolts 19, 19 in a usual manner. Said rollers are adapted to rest on and be moved along a suitable base plate 23 which forms a runway therefor. Said base plate is adapted to be held in a stationary position on the ground by means of jacks 24, 24 adapted to engage suitable sockets formed in opposite sides of said base plate and be interposed between said base plate and the mine roof in a usual manner.

A guide member 25 at the center of the base plate 23 forms a guide for the carrier member 15 and a means about which said carrier member may pivot. As herein shown, said guide member comprises an anti-friction roller 26 disposed above said base plate and mounted for rotation about a vertical axis on a bolt 28 extending upwardly from said base plate. Said guide roller is adapted to engage either side of a rectilinear guide 27 depending from and extending longitudinally along the bottom of said carrier member. Said guide consists of a pair of parallel spaced inwardly facing angles 29, 29 secured to the under side of the support bracket 20 and depending therefrom.

The carrier member 15 is held from vertical displacement by means of a pair of retaining members 30, 30 extending angularly upwardly from the sides of said base plate and horizontally over the rollers 22, 22. As herein shown said retaining members are provided with sides 31, 31 converging to a point at the center thereof to permit rectilinear movement of said carrier member along the base plate 23 when pivoted about the guide member 25 (see Figure 5).

A pivotal support member 33, herein shown as being of a cylindrical formation, with a closed upper end and open lower end is secured to and extends upwardly from the support bracket 20. A flanged bearing member 34 has an inner surface conforming to the form of the pivotal support member 33 and extends thereover and is held in engagement therewith by means of a nut and bolt 35. Said flanged bearing member has the under side of a reinforcing plate 36 resting on its upper surface, which plate is secured to the bottom of the trough section 18. Said reinforcing plate and trough section are secured to the flange of said flanged bearing member by means of rivets in a suitable manner.

In a like manner the trough section 14 has a reinforcing plate 37 secured to its under surface for reinforcing its bottom. Said plate and trough section are bored on the longitudinal center line thereof and engage the outer periphery of the flanged portion of the flanged bearing member 34. An annular ring 38 is secured to the under surface of said flange and is secured thereto by means of suitable cap screws in a usual manner. Said annular ring extends beyond the periphery of said flanged portion and forms a retaining member to prevent vertical displacement of said trough sections with respect to each other.

Figure 3:
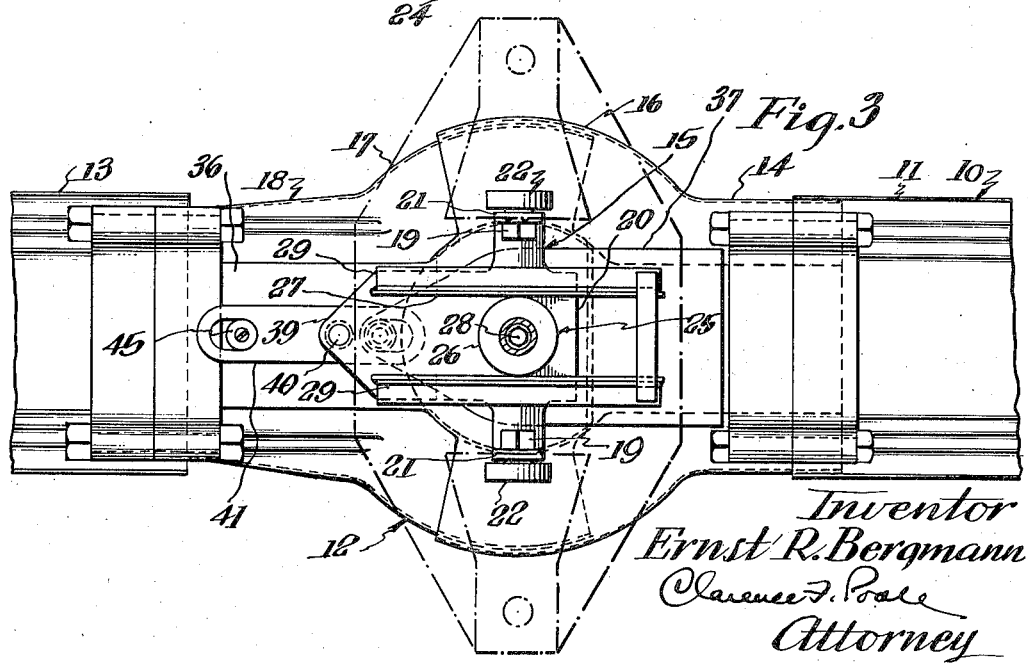
Figure 3 is an enlarged bottom plan view of the swivel shown in Figures 1 and 2.

Referring now in particular to the means for neutralizing side thrust on the driven trough section 13 during the conveying operation when said trough section is in various angular positions of adjustment with respect to the driving trough section 11, the support bracket 20 is provided with a projecting forward end 39 (see Figures 3 and 4). A pivotal pin 40 is secured to said forward projection and extends upwardly therefrom. A link 41 is pivotally mounted on said pin intermediate its ends. The ends of said link are each slotted and, as herein shown, one slotted end thereof is adapted to engage a roler 42 disposed beneath the trough section 14 and mounted on a depending pin 43 secured to a forward projection 44 of the reinforcing plate 37. The opposite slotted end of said link is adapted to engage a roller 45 mounted on the lower end of pin 46 secured to and depending from the reinforcing plate 36.

It may be seen from the foregoing that, when the driven trough section 13 is pivoted about its axis of pivotal connection to the carrier member 15, the link 41 will pivot said carrier member about said pivotal axis of said trough section and about the guide member 25 at an angle which is less than the angle of said driven trough section with respect to said driving trough section and, as herein shown, is substantially half the angle of said driven trough section with respect to said driving trough section. Thus during reciprocable movement of the shaker conveyer the carrier member 15 will be guided in a line inclined with respect to the center line of the driving trough section 11 at an angle with respect thereto which is less than the angle of inclination of the driven trough section. This will reduce angular side thrusts on the driven trough section by an amount equal to the difference between the angle of said driven trough section and carrier member, and said side thrusts will be at the angle of inclination of said carrier member with respect to the driven trough section instead of the angle of inclination of the driving trough section. This will also decrease the tendency for material to move towards the side of the trough and increase the rate of coal travel along said driven trough section.

Figure 2:
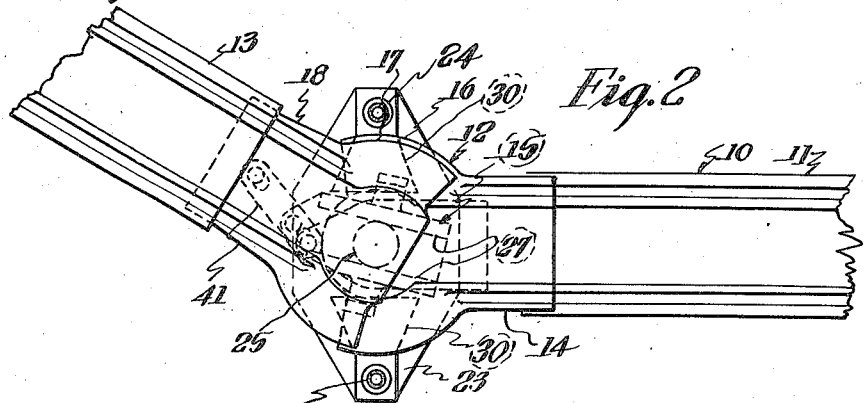
Figure 2 is a view similar to Figure 1 but with the driven section of the trough line positioned in an opposite direction than in Figure 1.

It may also be seen with reference to Figures 1 and 2 that the arrangement of the link 41 is such that the angle of the carrier member with respect to the driving and driven trough sections is always less than or substantially half of the angle of the driven trough section with respect to the driving trough section in all positions of said driven trough section with respect to said driving trough section, except when the driven trough section is in alignment with the driving trough section, in which case the carrier member 15 will be guided along the base plate 23 in a path which is in alignment with the path of travel of the aligned trough sections 11 and 13.

With reference now in particular to Figures 6 and 7 and the modified form of my invention illustrated therein, the general construction of the parts is the same as in Figures 1 to 5 inclusive so the same reference characters will be applied to these parts as were applied to Figures 1 to 5 inclusive.

In Figure 7 it will be noted that the trough sections 14 and 18 are pivotally connected together in a manner similar to that shown in Figures 4 and 5, but that the support bracket 20 has projecting forward and rearward ends 47, 47 to which are pivotally connected links 48, 48 on upwardly extending pivotal pins 50, 50 engaging slots 49, 49 formed in said links.

An annular shouldered member 53 is secured to the under side of the flanged bearing member 34 and moves therewith upon pivotal movement of the trough section 18. Said shouldered member serves as a retaining member to prevent vertical displacement of the trough sections 14 and 18 with respect to each other in much the same manner as the annular ring 38. A bored bracket 54 is secured to the periphery of said annular shouldered member in a suitable manner. The forward and rearward projecting ends of said bracket each have a pin 56 secured thereto and depending therefrom. Said pins are slidably mounted in the slots 49, 49 to pivotally move said links upon pivotal movement of said bracket and the trough section 18.

A pin 57 is secured to and depends from a forward extension 58 of the reinforcing plate 37 of the trough section 14 and is pivotally connected to the free end of the forward link 48. In a like manner a pin 59 depends from said reinforcing plate adjacent the rearward end thereof and is pivotally connected to the free end of the rearward link 48. From this it may be seen that pivotal movement of the driven trough section 13 will pivot the carrier member at an angle which is less than or substantially half the angle of said driven trough section with respect to said driving trough section, and that the side thrusts imparted to the carrier member are taken on both the forward and rearward ends of the support bracket 20.

While I have herein shown and described one form in which my invention may be embodied, it will be understood that the construction thereof and the arrangement of the various parts may be altered without departing from the spirit and scope thereof. Furthermore, I do not wish to be constructed as limiting myself to the specific embodiment illustrated, excepting as it may be limited in the appended claims.

I claim as my invention:

1. In a shaker conveyer, a trough line including a driving trough section and a driven trough section, a swivel adapted to permit one section of the trough line to be pivoted with respect to the other section in a horizontal plane and minimize angular side thrusts in the driven section comprising an anti-friction support for said trough sections, coaxial pivotal connections between said driving and driven trough sections and said support, a stationary base adapted to form a guide for said support, and a link pivotally connected between said trough sections and support to pivot said support about said guide at a lesser angle than the angle of said driven trough section.

2. In a shaker conveyer, a trough line including a driving trough section and a driven trough section, a swivel adapted to permit one section of the trough line to be pivoted in various angular positions with respect to the other section in a horizontal plane and minimize angular size thrusts in the conveying motion of the driven section comprising an anti-friction support for said trough section having a rectilinear guide formed therein, pivotal connections between said driven trough section and said support, a base having an anti-friction guide member thereon adapted to be engaged by said rectilinear guide, and a link pivotally connected between said trough sections and support to pivot said support about said guide at a lesser angle than the angle of said driven trough section and hold said support for rectilinear movement in such a position.

3. In a shaker conveyer, a trough line including a driving trough section and a driven trough section, a swivel adapted to permit one section of the trough line to be pivoted with respect to the other section in a horizontal plane and minimize angular side thrusts in the driven section comprising an anti-friction support for said trough sections, coaxial pivotal connections between said driving and driven trough sections and said support, a stationary base adapted to form a runway for said support, an anti-friction guide on said base and adapted to be engaged by said support and form a guide therefor, and means pivotally connected between said trough sections and support to pivot said support about said guide at a lesser angle than the angle of said driven trough section.

4. In a shaker conveyer, a trough line including a driving trough section and a driven trough section, a swivel adapted to permit one section of the trough line to be pivoted in various angular positions with respect to the other section in a horizontal plane and minimize angular side thrusts in the conveying motion of the driven section comprising an anti-friction support for said trough sections having a rectilinear guide formed therein, pivotal connections between said driving and driven trough sections and said support, a stationary base adapted to be held from movement with respect to the ground and forming a runway for said support, an anti-friction guide disposed centrally of said base and adapted to be engaged by said rectilinear guide and form a means about which said support may pivot, and a link pivotally connected between said trough sections and support to pivot said support about said guide at a lesser angle than the angle of said driven trough section and hold said support in such a position for rectilinear movement along said anti-frictional guide.

5. In a shaker conveyer, a trough line including a driving trough section and a driven trough section, a swivel adapted to permit one section of the trough line to be pivoted in various angular positions with respect to the other section in a horizontal plane and minimize angular side thrusts in the conveying motion of the driven section comprising an anti-friction support for said trough sections, a pivotal connection between said driving trough section and said support, a stationary base adapted to form a runway for said support, an anti-friction guide on said base and adapted to form a guide for said support and form a means about which said support may pivot, and a pair of links for controlling movement of said support, each of said links being pivotally connected to an end of said support intermediate their ends and pivotally connected to said driving and driven trough sections at their ends.

6. In a shaker conveyer and in combination with a shaker conveyer trough line, a swivel in said trough line arranged to neutralize angular side thrusts in the conveying motion of the driven portion of the trough line when horizontally pivoted with respect to the driving portion of the trough line comprising a stationary base, a slidable support adapted to be guided for movement along said base, a driving trough section supported on said slidable support and connected to the driving portion of the trough line, a driven trough section supported on said slidable support and mounted for pivotal movement about a vertical axis, said support being pivotally movable about an axis coaxial with the pivotal axis of said driven trough section, and a connection between said support and said driving and driven trough sections to pivot said support in the direction of movement of said driven trough section and hold said support for rectilinear movement at an angle which is less than the angle of said driven trough section with respect to said driving trough section.

7. In a shaker conveyer and in combination with a shaker conveyer trough line, a swivel in said trough line arranged to neutralize side thrusts in the conveying motion of the driven portion of the trough line when horizontally pivoted with respect to the driving portion of the trough line comprising a base having a guide member thereon, a wheeled support movable along said base and guided by said guide member, a driving trough section connected to the driving portion of the trough line and supported on said wheeled support, a driven trough section supported on said wheeled support and mounted for pivotal movement with respect to said driving trough section about a vertical axis, and a connection between said support and said driving and driven trough sections to move said support in the direction of pivotal movement of said driven trough section and position and hold said support for rectilinear movement along said guide member in a horizontal plane at an angle with respect to said driving section which is less than the angle of said driven trough section with respect to said driving trough section.

8. In a shaker conveyer and in combination with a shaker conveyer trough line, a swivel in said trough line arranged to neutralize side thrusts in the conveying motion of the driven portion of the trough line when horizontally pivoted with respect to the driving portion of the trough line comprising a base having a guide member thereon, a wheeled support movable along said base and guided by said guide member, a driving trough section connected to the driving portion of the trough line and supported on said wheeled support, a driven trough section supported on said wheeled support and mounted for pivotal movement with respect to said first trough about a vertical axis, said wheeled support being pivotally movable about an axis coaxial with the pivotal axis of said driven trough section, and a link connected between said trough sections and support to pivot said support in the direction of movement of said driven trough section at a lesser angle than the angle of said driven trough section and hold said support in such a position for rectilinear movement along said base.

9. In a shaker conveyer and in combination with a shaker conveyer trough line, a swivel in said trough line arranged to neutralize side thrusts in the driven portion of the trough line when horizontally pivoted with respect to the driving portion of the trough line comprising a base having a guide member thereon, a wheeled support movable along said base and guided by said guide member, a driving trough section connected to the driving portion of the trough line and supported on said wheeled support, a driven trough section supported on said wheeled support and mounted thereon for pivotal movement with respect to said first trough about a vertical axis, said wheeled support being pivotally movable about an axis coaxial with the pivotal axis of said driven trough section, and a link connected between said driving and driven trough sections at its ends and connected to said support intermediate its ends to pivot said support in the direction of movement of said driven trough section at a lesser angle than the angle of said driven trough section.

10. In a shaker conveyer, a conveyer trough line including a driving trough section and a driven trough section, and a supporting connection between adjacent ends of said trough sections adapted to permit one section to be pivoted with respect to the other in a horizontal plane and to reduce angular side thrust in the conveying motion of the driven section including a pair of connecting trough sections pivotally connected together and a movable support for said connecting trough sections, said support having said connecting trough sections pivotally mounted thereon for movement about a vertical axis, and means for guiding said support for movement in a path offset angularly from the path of movement of said driving trough section and dependent upon the angle of said driven trough section with respect to said driving trough section.

11. In a shaker conveyer, a conveyer trough line including a driving trough section and a driven trough section, and a supporting connection between adjacent ends of said trough sections adapted to permit one section to be pivoted with respect to the other in a horizontal plane and to reduce angular side thrust in the conveying motion of the driven section including a pair of connecting trough sections pivotally connected together and a movable support member for said connecting trough sections, said support having said connecting trough sections pivotally mounted thereon, and a connection between said support and one of said connecting trough sections for adjustably moving said support about a vertical axis in the direction of pivotal movement of said driven trough section and at a lesser angle than the angle of said driven trough section with respect to said driving trough section.

12. In a shaker conveyer, a conveyer trough line including a driving trough section and a driven trough section, a swivel adapted to permit one section of the trough line to be pivoted with respect to the other section in a horizontal plane and minimize angular side thrusts in the conveying motion of the driven section including a pair of connecting trough sections pivotally connected together and having connection with adjacent ends of said driving and driven trough sections, a movable support for said connecting trough sections, said support having said connecting trough sections pivotally mounted thereon, a stationary base adapted to form a guide for said support, and a connection between one of said connecting trough sections and said support to angularly move said support in the direction of pivotal movement of the driven trough section and position said support for rectilinear movement along said base in a horizontal plane, at an angle with respect to said driving trough section which is less than the angle of said driven trough section with respect to said driving trough section.

13. In a shaker conveyer, a conveyer trough line including a driving trough section and a driven trough section, a swivel adapted to permit one section of the trough line to be pivoted with respect to the other section in a horizontal plane and minimize angular side thrusts in the conveying motion of the driven section including a pair of connecting trough sections pivotally connected together and having connection with adjacent ends of said driving and driven trough sections, a movable support, said connecting trough sections being pivotally mounted thereon, a stationary guide against which said support is adapted to react, and a link connected between one of said trough sections and support to pivot said support in the direction of movement of said driven trough section and hold said support for movement along said guide in a horizontal plane at an angle with respect to said driving trough section which is less than the angle of said driven trough section with respect to said driving trough section.

14. In a shaker conveyer, a conveyer trough line including a driving trough section and a driven trough section, a swivel adapted to permit one section of the trough line to be pivoted with respect to the other in a horizontal plane, and minimize angular side thrusts in the conveying motion of the driven section including a pair of connecting trough sections pivotally connected together and having connection with adjacent ends of said driving and driven trough sections, a movable support, said connecting trough sections being pivotally mounted thereon and supported thereby, a stationary guide against which said support is adapted to react, and a link pivotally connected between said connecting trough sections at its ends and to said support intermediate its ends to pivot said support in the direction of movement of said driven trough section and hold said support for rectilinear movement along said guide at an angle with respect to said driving trough section which is less than the angle of said driven trough section with respect to said driving trough section.

15. In a shaker conveyer, a conveyer trough line including a driving trough section and a driven trough section, a swivel adapted to permit one section of the trough line to be pivoted with respect to the other section in a horizontal plane and minimize angular side thrusts in the conveying motion of the driven section including a movable support, a stationary base adapted to form a guide against which said support reacts, a pair of connecting trough sections pivotally mounted on said support and a connection between adjacent ends of said driving and driven trough sections and said connecting trough sections, and means for pivoting said support about said guide in the same direction said driven trough section is pivoted and holding said support for movement along said guide at an angle which is less than the angle of said driving trough section with respect to said driven trough section comprising a pair of links, each of said links being pivotally connected between opposite ends of said support and one of said connecting trough sections.

16. In a shaker conveyer, a conveyer trough line including a driving trough section and a driven trough section, a swivel adapted to permit one section of the trough line to be pivoted with respect to the other section in a horizontal plane and minimize angular side thrusts in the conveying motion of the driven section including a movable support, a pair of connecting trough sections pivotally mounted on said support, a stationary guide adapted to form a guide for said support and permit said support to be pivoted thereabout, and a link pivotally connected between said connecting trough sections and support to pivot said support about said guide at a lesser angle than the angle of said driven trough section and hold said support at such an angle during reciprocable movement of the conveyer.

17. In a shaker conveyer and in combination with a shaker conveyer trough line, a swivel in said trough line arranged to neutralize side thrusts in the conveying motion of the driven portion of the trough line when horizontally pivoted with respect to the driving portion of the trough line comprising a stationary base, a support adapted to be guided for movement along said base, a driving trough section pivotally mounted on said support and connected to the driving portion of the trough line, a driven trough section pivotally mounted on said support for movement about an axis coaxial with the axis of connection of said driving trough section to said support, and a link connected between said trough sections and support to pivotally move said support in the direction of movement of said driven trough section and hold said support for rectilinear movement along said base at an angle which is less than the angle of said driven trough section with respect to said driving trough section.

ERNST R. BERGMANN.